(12) United States Patent
Li et al.

(10) Patent No.: US 12,182,403 B2
(45) Date of Patent: Dec. 31, 2024

(54) ADAPTIVE UNIFIED MEMORY MANAGEMENT METHOD AND SYSTEM FOR LARGE-SCALE GRAPHS

(71) Applicant: SHANGHAI JIAO TONG UNIVERSITY, Shanghai (CN)

(72) Inventors: Chao Li, Shanghai (CN); Pengyu Wang, Shanghai (CN); Chuanming Shao, Shanghai (CN); Jing Wang, Shanghai (CN); Jinyang Guo, Shanghai (CN); Haojin Zhu, Shanghai (CN); Minyi Guo, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 61 days.

(21) Appl. No.: 18/040,905

(22) PCT Filed: Jan. 18, 2021

(86) PCT No.: PCT/CN2021/072376
§ 371 (c)(1),
(2) Date: Feb. 7, 2023

(87) PCT Pub. No.: WO2022/099925
PCT Pub. Date: May 19, 2022

(65) Prior Publication Data
US 2023/0297234 A1      Sep. 21, 2023

(30) Foreign Application Priority Data
Nov. 10, 2020   (CN) .......................... 202011244031.3

(51) Int. Cl.
*G06F 3/06*     (2006.01)
*G06T 1/20*     (2006.01)

(52) U.S. Cl.
CPC .......... *G06F 3/0608* (2013.01); *G06F 3/0644* (2013.01); *G06F 3/0673* (2013.01); *G06T 1/20* (2013.01)

(58) Field of Classification Search
CPC ........ G06F 3/0608; G06F 3/0673; G06T 1/20
See application file for complete search history.

(56) References Cited

U.S. PATENT DOCUMENTS

| | | | |
|---|---|---|---|
| 8,373,710 B1* | 2/2013 | Vij ........................ | G06F 9/5044 345/502 |
| 2013/0212594 A1* | 8/2013 | Choi ..................... | G06F 9/5066 718/104 |

(Continued)

FOREIGN PATENT DOCUMENTS

CN           110471766 B   * 12/2022   ........... G06F 9/5027

OTHER PUBLICATIONS

Khorasani, Farzad, "Scalable SIMD-Efficient Graph Processing on GPUs", 2015 International Conference on Parallel Architecture and Compilation (PACT), Mar. 2016, pp. 39-50. (Year: 2016).*

(Continued)

*Primary Examiner* — Terrell M Robinson
(74) *Attorney, Agent, or Firm* — CBM PATENT CONSULTING, LLC

(57) ABSTRACT

An adaptive, large graph-oriented unified memory management method is proposed; according to the order of priorities of different types of graph data structure in a graph computing application, whether the current GPU memory is full is sequentially determined by means of GPU memory checking; whether the size of current graph data exceeds the available memory capacity of the GPU is determined by means of data overflow checking; and then a unified memory management policy is configured; the method uses different graph algorithms based on the characteristics of graph data structure and the size of the available GPU (Continued)

memory; the method can significantly improve the performance of processing large graphs, which exceed the video memory capacity under a unified memory architecture, including improving GPU bandwidth utilization, reducing the number of page faults and the overhead of processing page faults, and speeding up the execution of graph computing programs.

6 Claims, 2 Drawing Sheets

(56) References Cited

U.S. PATENT DOCUMENTS

| | | | |
|---|---|---|---|
| 2014/0281323 A1* | 9/2014 | Duluk, Jr. | G06F 12/1009 711/165 |
| 2015/0170316 A1* | 6/2015 | Balmin | G06F 17/10 345/503 |
| 2019/0266695 A1* | 8/2019 | Rao | G06F 12/109 |
| 2023/0244537 A1* | 8/2023 | Wang | G06F 9/505 718/1 |

OTHER PUBLICATIONS

Kim, Youngrang, "Comprehensive techniques of multi-GPU memory optimization for deep learning acceleration" Aug. 2019, pp. 2193-2204. (Year: 2019).*

* cited by examiner

ADAPTIVE UNIFIED MEMORY MANAGEMENT METHOD AND SYSTEM FOR LARGE-SCALE GRAPHS

TECHNICAL FIELD

The invention relates to a technology in the field of graph data processing, in particular to a method and system for dynamically configuring memory for a read strategy of large graph data whose size exceeds the Graphics Processing Unit (GPU) memory capacity adaptively for a Unified-Memory-based architecture.

BACKGROUND

Unified Memory introduces a unified memory space to the existing GPU memory management method, allowing programs to use a pointer to directly access the main memory of the Central Processing Unit (CPU) or the GPU memory. This technology enables GPUs to increase the available address space so that GPUs can process large-scale graph data that exceeds the memory capacity of GPUs. However, directly using this technique often comes with a significant performance penalty.

BRIEF DESCRIPTION OF INVENTION

Targeting the above-mentioned deficiencies of the prior arts, the present invention proposes a kind of adaptive, unified memory management method and system for large graphs. It adopts different graph algorithms based on the characteristics of graph data and the size of the available GPU memory. It can significantly improve the performance of processing large graphs whose sizes exceed the GPU memory capacity under the unified memory architecture, including improving GPU bandwidth utilization, reducing the number of page faults and the overhead of processing page faults, and speeding up the running time of graph computing programs.

The present invention is achieved by the following technical solutions:

The present invention relates to a kind of adaptive unified memory management method tailored to large graphs. Given different types of graph data structure in graph computing applications, it assigns a priority order to those data structures. According to the priority order, it successively performs GPU memory checking to see whether the current GPU memory is full and performs data overflow checking to see whether the size of the current data structure exceeds the available memory capacity of the GPU, and then it performs policy configuration for unified memory management.

The described different types of graph data structure include Vertex Offset, Vertex Property, Edge and Frontier where Vertex Offset, Vertex Property, Edge are three arrays for Compressed Sparse Row (CSR).

The described priority order refers to: the graph data structure is ranked in descending order of their access times during the execution of the graph algorithm; specifically, the order is: Vertex Property, Vertex Offset, Frontier, and Edge.

The described graph algorithm can be divided into traversal algorithms or computational algorithms, including but not limited to single source shortest path algorithm (SSSP), breadth-first search algorithm (BFS), web page ranking algorithm (PageRank, PR), and connected component algorithm (CC).

The described GPU memory checking calls the cudaMemGetInfo API to determine the remaining capacity of the GPU memory. The data overflow checking determines whether the size of the data structure exceeds the size of the available memory of the GPU.

The described policy configuration for unified memory management sets the management strategy of the current graph data structure by calling APIs including but not limited to cudaMemPrefetchAsync and cudaMemAdvise, wherein: cudaMemPrefetchAsync can move part of data in advance to GPU memory; cudaMemAdvise can be set for specified data a memory usage hint that guides the GPU driver control data movement in an appropriate way and improve the final performance. The optional data usage hints include AccessedBy and ReadMostly. These instructions are for NVIDIA's various series of GPUs, specifically including:

1 For Vertex Property data, when the GPU memory is full, set the hint of Vertex Property to AccessedBy; otherwise, that is, when the GPU memory is not full and when the Vertex Property does not exceed the GPU's available memory capacity, set the prefetching size of Vertex Property to the size of the Vertex Property; when the Vertex Property exceeds the available memory capacity of the GPU, set the hint of the Vertex Property to AccessedBy, and set the prefetching amount of the Vertex Property as: the prefetch rate multiplies available memory capacity of the GPU, measured in bytes.

2 For Vertex Offset data, when the GPU memory is full, set the hint of Vertex Offset to AccessedBy; otherwise, that is, when the GPU memory is not full and when the Vertex Offset does not exceed the GPU's available memory capacity, set the prefetching size of Vertex Offset to the size of the Vertex Offset; when the Vertex Offset exceeds the available memory capacity of the GPU, set the hint of the Vertex Offset to AccessedBy, and set the prefetching amount of the Vertex Offset as: the prefetch rate multiplies the available memory capacity of the GPU, measured in bytes.

3 For Frontier data, when the GPU memory is full, set the hint of Frontier to AccessedBy; otherwise, that is, when the GPU memory is not full and when the Frontier does not exceed the GPU's available memory capacity, set the prefetching size of Frontier to the size of the Frontier; when the Frontier exceeds the available memory capacity of the GPU, set the hint of the Frontier to AccessedBy, and set the prefetching amount of the Frontier as: the prefetch rate multiplies available memory capacity of the GPU, measured in bytes.

4 For Edge data, when the GPU memory is full, set the hint of Edge to AccessedBy; otherwise, that is, when the GPU memory is not full and when the Edge does not exceed the GPU's available memory capacity, set the prefetching size of Edge to the size of the Edge; when the Edge exceeds the available memory capacity of the GPU, set the hint of the Edge to AccessedBy, and set the prefetching amount of the Edge as: the prefetch rate multiplies the available memory capacity of the GPU, measured in bytes.

TECHNICAL EFFECT

The present invention as a whole solves the technical problem that the existing GPU does not have the ability to process a large-scale graph that exceeds the GPU memory.

Compared with prior art, the present invention uses unified memory technology to manage graph data, according to specific priority order, adopts pertinent management strategy to different graph data structures, according to the size of graph data and available GPU memory. The management strategy of adjusting graph data relative to size and type of graph algorithm significantly improves the operation efficiency of graph algorithm.

DETAILED DESCRIPTION OF THE INVENTION

Figure 1:
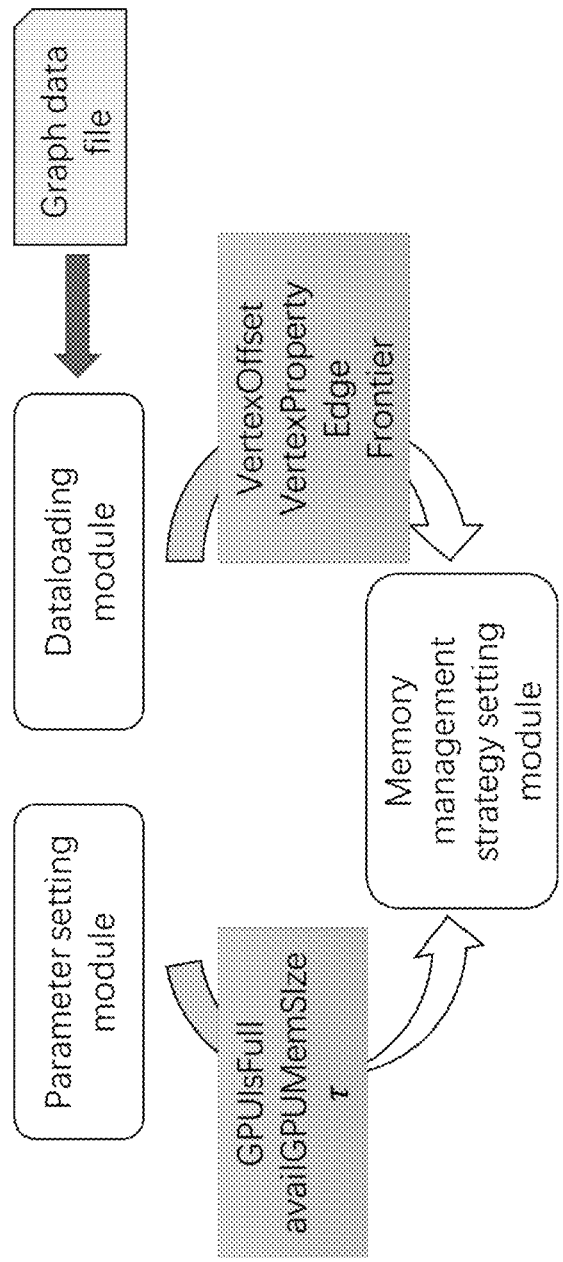
FIG. 1 is the system schematic diagram of the present invention.

As shown in FIG. 1, an adaptive large-graph-oriented unified memory management system involved in this embodiment includes: a system parameter setting module, a data loading module, and a memory management strategy setting module. The system parameter setting module that calls the CUDA programming interface to obtain and initialize the operating parameters of the memory management strategy. The data loading module reads the graph data file from the memory and builds the corresponding graph data structure in the CPU memory. The memory management strategy setting module calls the CUDA API for the graph data structures to set the strategy of prefetching and hints.

The operating parameters include: whether memory is full (GPUIsFull), currently available memory capacity of the GPU (AvailGPUMemSize) and prefetching rate τ.

The initialization refers to: setting GPUIsFull to false; obtaining AvailGPUMemSize through cudaMemGetInfo.

The read-ahead rate τ is set to 0.5 for traversal graph algorithms (such as BFS) and 0.8 for computational graph algorithms (such as CC).

The described CUDA APIs includes but not limited to those that allow the same functionality as the explicit memory copy and memory-pinning APIs without reverting to the constraints of explicit GPU memory allocation: explicit prefetching (cudaMemPrefetchAsync) and memory hints (cudaMemAdvise).

Figure 2:
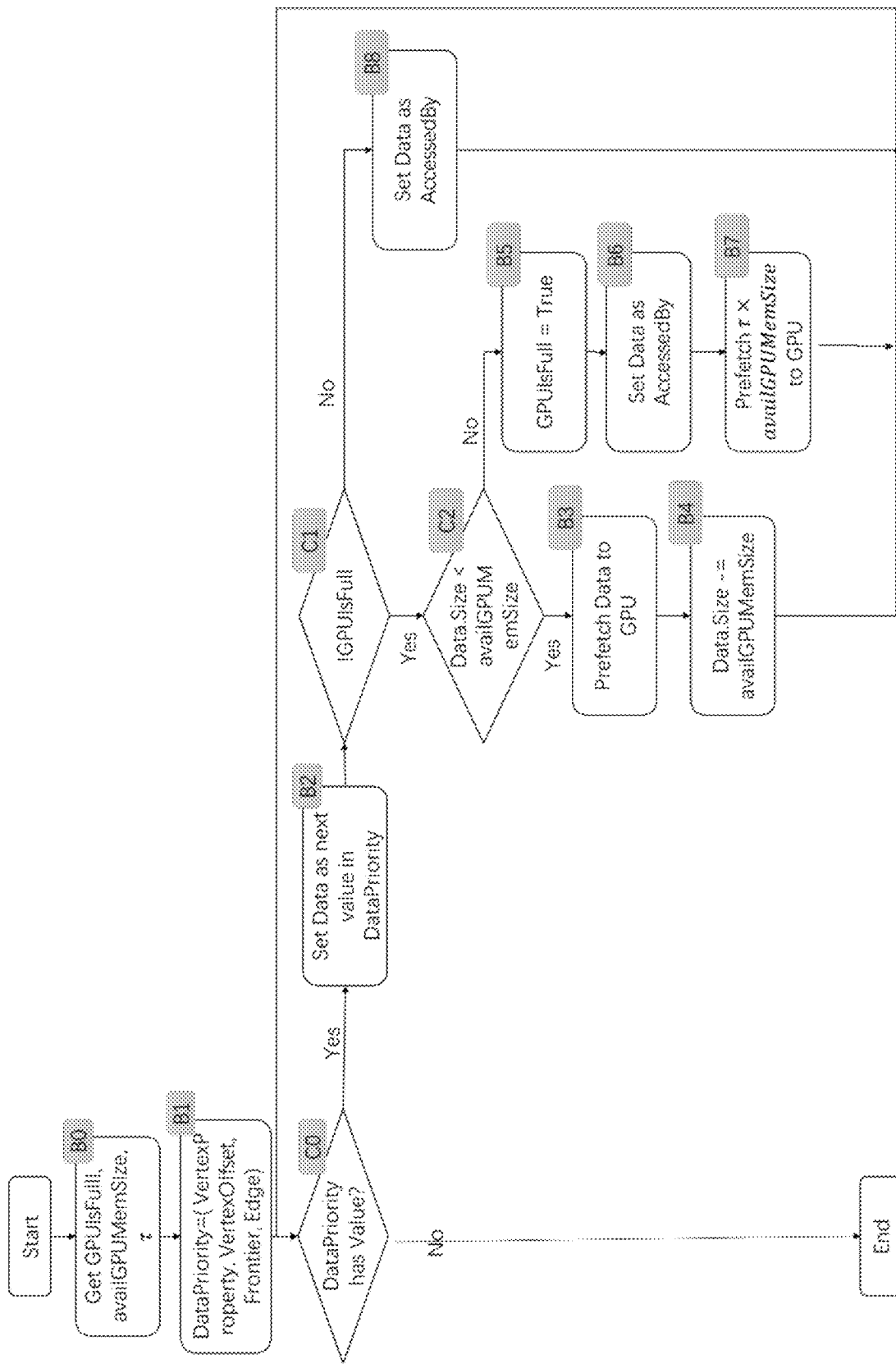
FIG. 2 is a schematic flowchart of the memory management strategy setting of the present invention.

As shown in FIG. 2, this example relates to an adaptive memory management method based on the above system, including the following steps:

Step 1 (B0 in FIG. 2): Obtain the initial values of the running parameters (GPUIsFull, AvailGPUMemSize, τ).

Step 2 (B1, C0 in FIG. 2): Set a memory management strategy for each data structure (Vertex Property, Vertex Offset, Frontier, Edge) in turn, and judge each data structure in turn:

Step 2.1 (C1 in FIG. 2): When the value of the variable GPUIsFull is false, perform step 2.1.1; otherwise, perform Step 2.1.2.

Step 2.1.1 (C2 in FIG. 2): When the size of Data is smaller than AvailGPUMemSize, perform Step 2.1.1.1; otherwise, perform Step 2.1.1.2.

Step 2.1.1.1 (B3~B4 in FIG. 2): call cudaMemPrefetchAsync to prefetch Data into GPU memory; update the size of AvailGPUMemSize to AvailGPUMemSize-Data.size() where Data.size()represents the size of Data; return to Step 2.

Step 2.1.1.2 (B5~B7 in FIG. 2): set the memory to be full (GPUIsFull=true); call cudaMemAdvise to set the hint of Data as AccessedBy; call cudaMemPrefetchAsync to prefetch τ×AvailGPUMemSize data into GPU memory; go back to step 2.

Step 2.1.2 (B8 in FIG. 2): call cudaMemAdvise to set the hint of Data to AccessedBy; go back to step 2.

After detailed experiments, in a server environment equipped with Intel Xeon E5-2620 CPU, 128GB memory and NVIDIA GTX1080Ti GPU, based on this method, the graph algorithm is executed under different data sets, and the execution time of the algorithm is measured, that is, on the GPU from the total running time from start to finish, excluding time for preprocessing and data transfer. During the experiment, each algorithm is repeated 5 times, and the average value of the 5 execution times is taken.

The aforementioned dataset is a plurality of graph datasets of different sizes, specifically comprising social network graph datasets (LiveJournal, Orkut, Twitter, Friendster), and Internet snapshot graph datasets (UK-2005, SK-2005, UK-union), where the Livejournal dataset contains 5 million vertices and 69 million edges, with a volume of 1.4 GB; UK-union contains 133 million vertices and 5.5 billion edges, with a volume of 110 GB.

The aforementioned graph algorithm, is SSSP, BFS, PR, CC four kinds of graph algorithms, wherein SSSP, BFS are traversal algorithm, PR, CC are computational algorithm. For BFS and SSSP, the algorithm takes the first vertex in each graph dataset as the source vertex; for PR, set 0.85 as attenuation factor and 0.01 as fault-tolerant read. The condition for the algorithm to end running is that the algorithm converges, or the number of iterations reaches 100.

Experimental results show that the method can speed up the total execution time of graph computations by a factor of 1.1 to 6.6. Among them, SSSP has the highest performance improvement, while PR has the lowest performance improvement, indicating that this method is more beneficial to memory-intensive programs. τ=0.5 and τ=0.8 are the optimal read-ahead rates for ergodic and computational algorithms, respectively, which can achieve the highest average speedup of 1.43 and 1.48 times, respectively, compared to τ=0.

In summary, the present invention can significantly shorten the running time of the graph processing program for large-scale graphs.

The aforementioned specific implementation can be carried out with partial adjustment to it in different ways by those experts under the premise that it does not deviate from the principle of the present invention and purpose The protection scope of the present invention is based on claims and is not limited by the above-mentioned specific implementation, each implementation scheme within its scope is bounded by the present invention.

What is claimed is:

1. An adaptive large graph-oriented unified memory management method, characterized in that, an ordered setting procedure according to a priority of different types of graph data in a graph computing application, and a policy making procedure based on whether a GPU memory is full and a relative size of targeted data and available GPU memory capacity, and a described unified memory management strategy configuration sets the management strategy of the current graph data by calling cudaMemPrefetchAsync and cudaMemAdvise instructions, and data usage hints include AccessedBy and ReadMostly, wherein the cudaMemPrefetchAsync moves part of data to the GPU memory, the cudaMemAdvise is set for a memory usage hint that guides a GPU driver to control data movement for improving performance, the AccessedBy and ReadMostly are instructions for a series of GPUs, and the described unified memory management policy configuration specifically includes: (i) for Vertex Property data, when the GPU memory is full, set a hint of Vertex Property to AccessedBy; otherwise, that is, when the GPU memory is not full and when the Vertex Property does not exceed the GPU's available memory capacity, set a prefetching size of Vertex Property to the size of the Vertex Property; when the Vertex Property exceeds the available memory capacity of the GPU, set the hint of the Vertex Property to AccessedBy, and set a prefetching amount of the Vertex Property as: prefetch rate×available memory capacity of the GPU, measured in bytes; (ii) for Vertex Offset data, when the GPU memory is full, set the hint of Vertex Offset to AccessedBy; otherwise, that is, when the GPU memory is not full and when the Vertex Offset does not exceed the GPU's available memory capacity, set the prefetching size of Vertex Offset to the size of the Vertex Offset; when the Vertex Offset exceeds the available memory capacity of the GPU, set the hint of the Vertex Offset to AccessedBy, and set the prefetching amount of the Vertex Offset as: prefetch rate×available memory capacity of the GPU, measured in bytes; for Frontier data, when the GPU memory is full, set the hint of Frontier to AccessedBy; otherwise, that is, when the GPU memory is not full and when the Frontier does not exceed the GPU's available memory capacity, set the prefetching size of Frontier to the size of the Frontier; when the Frontier exceeds the available memory capacity of the GPU, set the hint of the Frontier to AccessedBy, and set the prefetching amount of the Frontier as: prefetch rate×available memory capacity of the GPU, measured in bytes; for Edge data, when the GPU memory is full, set the hint of Edge to AccessedBy; otherwise, that is, when the GPU memory is not full and when the Edge does not exceed the GPU's available memory capacity, set the prefetching size of Edge to the size of the Edge; when the Edge exceeds the available memory capacity of the GPU, set the hint of the Edge to AccessedBy, and set the prefetching amount of the Edge as: prefetch rate×available memory capacity of the GPU, measured in bytes.

2. The adaptive large graph-oriented unified memory management method according to claim 1, wherein a graph algorithm is traversal or computational, and the corresponding prefetch rate r is set to 0.5 for a traversal graph algorithm, while to 0.8 for computational graph algorithms.

3. The adaptive large graph-oriented unified memory management method according to claim 1, characterized in that it specifically includes:
step 1: obtaining an initial value of the running parameters,
step 2: using memory management strategy on each data in a graph data structure by turns, specifically:

step 2.1: when thea value of a variable GPUIsFull in the running parameters is false, execute step 2.1.1, wherein the GPUIsFull indicates the memory being full; otherwise, execute step 2.1.2;
step 2.1.1: when the size of the graph data is smaller than AvailGPUMemSize, execute step 2.1.1.1, wherein the AvailGPUMemSize indicates the GPU having available memory; otherwise, execute step 2.1.1.2;
step 2.1.1.1: call the cudaMemPrefetchAsync to prefetch the graph data into GPU memory; update the size of theAvailGPUMemSize to AvailGPUMemSize-Data.size ( ) where Data.size ( ) represents the size of Data; go back to step 2;
step 2.1.1.2: when the value of the variable GPUIsFull in the running parame ters is set to true, call thecudaMemAdvise to set the hint of Data to the AccessedBy; call the cudaMemPrefetchAsync to prefetch the graph data whose size is the prefetch rate $\tau$ multiplies the AvailGPUMemSize in the running parameters to the GPU In memory; return to step 2;
step 2.1.2: call the cudaMemAdvise to set the hint of Data to the AccessedBy; go back to step 2.

4. The adaptive large graph-oriented unified memory management method according to claim 3, wherein runtime parameters refer to: the GPUIsFull, indicating whether GPU memory is full, the availGPUMemSize, indicating a size of free GPU memory, and prefetching ratio $\tau$, indicating the prefetching ratio of a data region.

5. The adaptive large graph-oriented unified memory management method according to claim 4, wherein an initialization refers to: setting the GPUIsFull to false; obtaining the availGPUMemSize through cudaMemGetInfo, wherein cudaMemGetInfo determines remaining capacity of the GPU memory.

6. An adaptive large-graph-oriented unified memory management system for realizing the adaptive large graph-oriented unified memory management method according to claim 1, comprises: a system parameter setting circuit, a data loading circuit, and a memory management strategy setting circuit, wherein: the system parameter setting circuit calls a CUDA programming interface to obtain operating parameters of the memory management strategy and initializes it, and the data loading circuit reads a graph data file from a memory and builds a corresponding graph data structure in a CPU memory, and the memory management strategy setting circuit configures a prefetching strategy and data usage hint by calling a CUDA API.

* * * * *